United States Patent [19]

Nakano

[11] Patent Number: 6,161,057

[45] Date of Patent: Dec. 12, 2000

[54] APPARATUS FOR ANALYZING A PROCESS OF FLUID FLOW, AND A PRODUCTION METHOD OF AN INJECTION MOLDED PRODUCT

[75] Inventor: Ryo Nakano, Kyoto, Japan

[73] Assignee: Toray Industries, Inc., Tokyo, Japan

[21] Appl. No.: 09/072,017

[22] Filed: May 4, 1998

Related U.S. Application Data

[63] Continuation-in-part of application No. 08/508,899, Jul. 28, 1995.

[51] Int. Cl.[7] .................................................... B29C 45/00
[52] U.S. Cl. .......................................... 700/197; 700/203
[58] Field of Search .................................. 700/97, 91, 98, 700/118, 155, 151, 150, 182, 200, 197, 203, 204, 205

[56] References Cited

U.S. PATENT DOCUMENTS

| | | |
|---|---|---|
| 3,977,255 | 8/1976 | Groleau ................................. 73/432 R |
| 4,387,655 | 6/1983 | Chaiken . |
| 4,504,920 | 3/1985 | Mickowski . |
| 4,534,003 | 8/1985 | Manzione . |
| 4,641,270 | 2/1987 | Lalloz ..................................... 700/206 |
| 4,868,751 | 9/1989 | Dogru et al. . |
| 4,989,166 | 1/1991 | Akasaka et al. . |
| 5,031,108 | 7/1991 | Fujita et al. . |
| 5,031,127 | 7/1991 | Fujita et al. . |
| 5,035,598 | 7/1991 | Fujita et al. . |
| 5,072,782 | 12/1991 | Namba ..................................... 164/45 |
| 5,097,431 | 3/1992 | Harada et al. . |
| 5,097,432 | 3/1992 | Harada et al. . |
| 5,146,086 | 9/1992 | De et al. . |
| 5,350,547 | 9/1994 | Yamaguchi et al. . |
| 5,377,119 | 12/1994 | Backer et al. . |
| 5,549,857 | 8/1996 | Kamiguchi et al. . |
| 5,572,434 | 11/1996 | Wang et al. . |
| 5,812,402 | 9/1998 | Nishiyama .............................. 700/97 |
| 5,835,379 | 11/1998 | Nakano .................................. 700/200 |

FOREIGN PATENT DOCUMENTS

| | | |
|---|---|---|
| 0 525 198 | 2/1993 | European Pat. Off. . |
| 3743351 | 5/1988 | Germany . |
| 3830571 | 4/1989 | Germany . |
| 3839907 | 6/1989 | Germany . |
| 6-122068 | 6/1994 | Japan . |

OTHER PUBLICATIONS

Revue Generale Des Caoutchoucs et Plastiques, vol. 71, No. 734:37–38, 40, 42, Sep. 1, 1994, XP000465010 Terrisse J., "Les Atouts de la Buse Rheometrique EAPH".
European Search Report dated Dec. 6, 1995.
Patent Abstracts of Japan, vol. 17, No. 123 (M–1380), Mar. 15, 1993 and JP–A–04 305424 (Dainippon Printing Co., Ltd.) abstract only.
Patent Abstracts of Japan, vol. 17, No. 172 (M–1392), Apr. 2, 1993 and JP–A–04 331125 (Sekisui Chem. Co., Ltd.) abstract only.
Patent Abstracts of Japan, vol. 95, No. 5 and JP–A–07 125034 (Toray Ind. Inc.), May 16, 1995 abstract only.

*Primary Examiner*—Thomas C. Lee
*Assistant Examiner*—Willie Martin
*Attorney, Agent, or Firm*—Morrison & Foerster, LLP

[57] ABSTRACT

The present invention provides an apparatus and method for analyzing a process of fluid flow such as an injection molding process within a practical computing time using a three-dimensional model divided into a plurality of small elements to represent a cavity in which a fluid flows, and provides also an apparatus and method for analyzing an injection molding process, an injection molded product, and a method for producing an injection molded product.

The apparatus and method for analyzing a process of fluid flow of the present invention comprises constructing a three-dimensional model divided into a plurality of small elements to represent a cavity in which a fluid flows, determining the flow conductances κ based on the flow thicknesses in the cavity, and computing pressures, pressure transitions or flow velocities at the respective small elements based on the flow conductances.

19 Claims, 9 Drawing Sheets

APPARATUS FOR ANALYZING A PROCESS OF FLUID FLOW, AND A PRODUCTION METHOD OF AN INJECTION MOLDED PRODUCT

This application is a Continuation-in-Part of Ser. No. 08/508,899 filed Jul. 28, 1995.

SPECIFICATION

1. Title of the Invention

An apparatus for analyzing a process of fluid flow, and a production method of an injection molded product

2. Field of the Invention

The present invention relates to an apparatus and method for analyzing a process of fluid flow, by finding pressures or pressure transitions or flow velocities of the fluid in the process of fluid flow, and an apparatus and method for analyzing an injection molding process by applying said apparatus or method, and a method for producing an injection molded product by determining the molding conditions using said method for analyzing an injection molding process, and an injection molded product produced by said method.

3. Description of the Prior Arts

In general, methods for analyzing processes of fluid flow such as injection molding processes by reproducing the injection molding processes, etc. using computer simulation are widely practically used. The following description is mainly concerned with the methods for analyzing injection molding processes as typical methods for analyzing processes of fluid flow.

These injection molding process analyzing methods contribute to achieving higher quality, higher efficiencies and lower costs in the product development of injection molded products, etc. For example, these methods are disclosed in Japanese Patent Laid-Open (Kokai) Nos. 3-224712, 4-152120, 4-305424, 4-331125, etc. These injection molding process analyzing methods use two-dimensional models for finding the pressures, temperatures, shear stresses, etc. at respective portions.

In these conventional injection molding process analyzing methods, since a two-dimensional model is used as the model of a cavity into which a fluid flows (the model of a mold with the same shape as an injection molded product), the inside of the cavity is divided into many portions expressed as two-dimensional small elements such as triangles and quadrilaterals, and the pressures, temperatures, shear stresses, etc. at the respective small elements are found by a numerical analysis technique using a computer.

In the conventional injection molding process analyzing methods, when the shape of a cavity can be approximated by combining two-dimensional figures, for example, when the thickness of the cavity is thin for the entire size of the cavity, the results obtained by analysis can be highly accurate.

However, when the molded product is more than 5 mm in thickness or generally small like a connector, the conventional analyzing methods do not allow highly accurate analysis since the three-dimensional flow such as flow in the thickness direction becomes influential. Moreover, even when the molded product is thin, the conventional methods of using plane elements give little useful information in the accurate analysis of local flow conditions as in a step shape portion or corner shape portion of the product.

So, it is attempted to achieve high accuracy by using three-dimensional small elements for modeling the inside of a cavity (three-dimensional model) as practiced in general numerical analysis methods such as the finite element method.

However, generally, to obtain a highly accurate solution by using a three-dimensional model, the inside of the cavity must be divided finely into numerous small elements. In general, according to a numerical analysis method for analyzing a fluid flow process by dividing a shape into small elements, the physical quantities such as pressures distributed at the respective small elements are approximated by simple functions such as linear functions, and for functional approximation of a region where a physical quantity changes sharply, very small elements are necessary, hence numerous small elements are necessary. Especially the velocity at a portion in contact with the surface of a mold is greatly different from the velocity at a central portion in thickness, and for more accurate analysis, it is preferable that the region is divided into four or more layers of small elements in thickness direction.

This tendency is more remarkable when the molded product is thinner. However, it is difficult to construct an analytical model divided in many layers in thickness direction to express a thin molded product with a complicated shape including ribs, steps, curves, etc., and it also takes enormous time. Furthermore, the model constructed like this contains numerous small elements, and requires enormous time for analysis unpractically. That is, in the case of an injection molded product with a complicated shape containing both thin portions and thick portions, it has been difficult to analyze the fluid flow process by dividing the entire product into three-dimensional small elements.

For an injection molded product containing both thin portions and thick portions, it can also be considered to adopt a technique of dividing a thin portion to form a two-dimensional model and dividing a thick portion to form a three-dimensional model. However, in such a mixed model, the joint between the two-dimensional small elements and the three-dimensional small elements is greatly different in form from the actual joint.

At the joint between a thin portion and a thick portion, the entire thickness of each of the small elements expressing the thin portion must contact the thick portion, but in the mixed model, only the linear edge of each two-dimensional element, i.e., only a side of a triangle or quadrilateral contacts the thick portion. So, a mixed model threatens to lower the accuracy of analysis in the vicinity of the joint.

For example, as shown in FIG. 11, in the case of a molded product 11 containing a thin portion 9 and a thick portion 10, if conventional two-dimensional small elements 18 and three-dimensional small elements 17 are combined to express the molded product as shown in FIG. 16, the accuracy of analysis in the area near the joint 19 between both the portions declines.

This problem is described below in reference to FIGS. 17, 18 and 19. FIG. 18 shows how a fluid 23 flows when a model in which both a thin portion 20 and a thick portion 21 are divided into three-dimensional small elements is constructed. FIG. 19 shows how a fluid 26 flows when a model in which a thin wall portion 24 is divided into two-dimensional small elements while a thick portion 25 is divided into three-dimensional small elements is constructed. When attention is paid to the actual flow of the fluid, as shown in FIG. 18, the fluid 23 flowing from the thin portion 20 into the thick portion 21 flows in parallel to the thin portion 20 since the thickness is not zero. Therefore, the model of FIG. 18 is highly likely to give an accurate result.

On the other hand, in the model of FIG. 19, as shown in FIG. 17, since the two-dimensional small element 27 of the thin portion contacts the three-dimensional small element 28 of the thick portion only at the linear edge 29 of the two-dimensional small element 27, the analysis is likely to give a result that the fluid 26 flows radially as shown in FIG. 19. This does not correctly express the fact. For example, at a corner of the thick portion, the fluid is analyzed to collide with the wall face of the mold at an almost perpendicular angle. So, the analysis suggests that the surface appearance of the injection molded product is impaired. As a result, the condition which actually allows normal molding is judged wrongly as a condition not suitable for molding. In FIG. 17, symbol 30 denotes the actual top face of the thin portion of the mold, and symbol 31, the actual bottom face.

Moreover, in the case of a mixed model, special knowledge and technique are required for constructing a model with certain accuracy of analysis, for example, as to what portion should be modeled by two-dimensional elements.

Furthermore, even when the molded product as a whole is thinly formed, it has been difficult to utilize the CAD (computer aided design) data used in product design for reducing the effort of entering the shape for analysis. In the conventional two-dimensional analyzing methods, three-dimensional CAD data cannot be directly used as basic data for modeling, and neutral faces across the thicknesses (a neutral face is a virtual face consisting of a set of intermediate points in the thickness direction at respective positions of the thin portion) must be re-defined for re-constructing the shape. Also in the case of a mixed model, for a portion of two-dimensional elements, the neutral face across the thickness must be re-defined as in the conventional methods. So, enormous efforts must be made for constructing the analytical model, requiring a longer time for analysis, and in addition, an operator skilled in defining the shape is necessary.

SUMMARY OF THE INVENTION

A first object of the present invention is to provide an apparatus and method for analyzing a process of fluid flow in a cavity containing a narrow portion, which can be used to accurately represent the flow channel of the fluid and to realize accurate analysis within a practical computing time using a three-dimensional model.

A second object of the present invention is to provide an apparatus and method for analyzing an injection molding process for an injection molded product containing a thin portion, which can be used to accurately represent the shape of the molded product and to realize accurate analysis within a practical computing time using a three-dimensional model.

A third object of the present invention is to provide a method for efficiently producing a high quality injection molded product by determining injection molding conditions such as product shape, mold design and material selection using said apparatus for analyzing an injection molding process.

The apparatus for analyzing a fluid flow process of the present invention comprises (A1) three-dimensional model constructing means for constructing a three-dimensional model divided into a plurality of small elements representing at least part of a cavity in which fluid flows having a narrow portion, a wide portion and a wall surface, (A2) flow conductance determining means, for
  (A2-1) determining the flow conductance κ of the fluid in the small elements in the narrow portion, based on the thickness of the narrow portion, and
  (A2-2) determining the flow conductance κ of the fluid as a small value when the small elements in the wide portion are located close to the cavity wall surface, for determining the flow conductance κ of the fluid as a large value when the small elements in the wide portion are located far from the cvity wall, and (A3) pressure computing means for finding pressures of the fluid at said respective small elements based on said flow conductances κ.

Another embodiment of the apparatus for analyzing a fluid flow process of the present invention comprises (B1) three-dimensional model constructing means for constructing a three-dimensional model divided into a plurality of small elements representing at least part of a cavity in which fluid flows having a narrow portion, a wide portion and a wall surface, (B2) flow-conductance determining means, for
  (B2-1) determining the flow conductance κ of the fluid in the small elements in the narrow portion, based on the thickness of the narrow portion, and
  (B2-2) determining the flow conductance κ of the fluid as a small value when the small elements in the wide portion are located close to the cavity wall surface, for determining the flow conductance κ of the fluid as a large value when the small elements in the wide portion are located far from the cavity wall surface, and (B3) pressure transition computing means for finding the pressure transitions of the fluid at said respective small elements based on said flow conductances κ.

A further other embodiment of the apparatus for analyzing a fluid flow process of the present invention comprises (C1) three-dimensional model constructing means for constructing a three-dimensional model divided into a plurality of small elements representing at least part of a cavity in which fluid flows having a narrow portion, a wide portion and a wall surface, (C2) flow conductance determining means, for
  (C2-1) determining the flow conductance κ of the fluid in the small elements in the narrow portion, based on the thickness of the narrow portion, and
  (C2-2) determining the flow conductance κ of the fluid as a small value when the small elements in the wide portion are located close to the cavity wall surface, for determining the flow conductance κ of the fluid as a large value when the small elements in the wide portion are located far from the cavity wall surface, and (C3) flow velocity computing means for finding flow velocities of the fluid at said respective small elements based on said flow conductances κ.

The method for analyzing a fluid flow process of the present invention comprises (E1) constructing a three-dimensional model divided into a plurality of small elements representing at least part of a cavity in which fluid flows, (E2) determining the flow conductances κ of the fluid at the small elements, based on the flow thicknesses of the small elements, (E3) finding pressures of the fluid at the respective small elements based on the determined flow conductances κ, and (E4) analyzing the process of the fluid flow in reference to the found pressures.

Another embodiment of the method for analyzing a fluid flow process of the present invention comprises (F1) constructing a three-dimensional model divided into a plurality of small elements representing at least part of a cavity in which fluid flows, (F2) determining the flow conductances κ of the fluid at the small elements, based on the flow thicknesses of the respective small elements, (F3) finding the pressure transitions of the fluid at the respective small elements based on the determined flow conductances κ, and (E4) analyzing the process of the fluid flow in reference to the found pressure transitions.

A further other embodiment of the method for analyzing a fluid flow process of the present invention comprises (G1) constructing a three-dimensional model divided into a plurality of small elements representing at least part of a cavity where a fluid flows, (G2) determining the flow conductances κ of the fluid at the small elements, based on the flow thicknesses of the respective small elements, (G3) finding flow velocities of the fluid at the respective small elements based on the determined flow conductances κ, and (G4) analyzing the process of the fluid flow in reference to the found flow velocities.

The apparatus for analyzing an injection molding process of the present invention comprises (H1) three-dimensional model constructing means for constructing a three-dimensional model divided into a plurality of small elements representing at least part of an injection molded product having a narrow portion and a wide portion, (H2) flow conductance determining means, for
  (H2-1) determining the flow conductance κ of the injection molded material in the small elements in the narrow portion, based on the thickness of the narrow portion, and
  (H2-2) determining the flow conductance κ of the injection molded material as a small value when the small elements in the wide portion are located close to the mold surface, determining the flow conductance κ of the injection molded material as a large value when the small elements in the wide portion are located far from the mold surface, and (H3) pressure computing means for finding pressures of the injection molded material at said respective small elements based on said flow conductances κ.

Another embodiment of the apparatus for analyzing an injection molding process of the present invention comprises (I1) three-dimensional model constructing means for constructing a three-dimensional model divided into a plurality of small elements representing at least part of an injection molded product having a narrow portion and a wide portion, (I2) flow conductance determining means, for
  (I2-1) determining the flow conductance κ of the injection molded material in the small elements in the narrow portion, based on the thickness of the thin portion, and
  (I2-2) determining the flow conductance κ of the injection molded material as a small value when the small elements in the wide portion are located close to the mold surface, determining the flow conductance κ of the injection molded material as a large value when the small elements in the wide portion located far from the mold surface, and (I3) pressure transition computing means for finding the pressure transitions of the injection molded material at said respective small elements based on said flow conductances κ.

A further other embodiment of the apparatus for analyzing an injection molding process of the present invention comprises (J1) three-dimensional model constructing means for constructing a three-dimensional model divided into a plurality of small elements representing at least part of an injection molded product having a narrow portion and a wide portion, (J2) flow conductance determining means, for (J2-1) determining the flow conductance κ of the injection molded material in the small elements in the narrow portion, based on the thickness of the narrow portion, and
  (J2-2) determining the flow conductance κ of the injection molded material as a small value when the small elements in the wide portion are located close to the mold surface, for determining the flow conductance κ of the injection molded product as a large value when the small elements in the wide portion are located far from the mold surface, and (J3) flow velocity transition computing means for finding flow velocities of the injection molded material at said respective small elements based on said flow conductances κ.

In a preferable embodiment of the apparatus for analyzing an injection molding process of the present invention, the three-dimensional model constructing means constructs a three-dimensional model based on the CAD data or CAD surface data of an injection molded product.

The method for analyzing an injection molding process of the present invention comprises (K1) constructing a three-dimensional model divided into a plurality of small elements representing at least part of an injection molded product, (K2) determining the flow conductances κ of the injection molded material at the respective small elements, based on the flow thicknesses of said respective small elements of the injection molded product, (K3) finding pressures of the injection molded material at the respective small elements based on the determined flow conductances κ, and (K4) analyzing the injection molding process of the injection molded product in reference to the found pressures.

Another embodiment of the method for analyzing an injection molding process of the present invention comprises (L1) constructing a three-dimensional model divided into a plurality of small elements representing at least part of an injection molded product, (L2) determining the flow conductances κ of the injection molded material at the respective small elements, based on the flow thicknesses of the injection molded product at said respective small elements, (L3) obtaining pressure transitions of the injection molded material at the respective small elements based on the determined flow conductances κ, and (L4) analyzing the injection molding process of the injection molded product in reference to the found pressure transitions.

A further other embodiment of the method for analyzing an injection molding process of the present invention comprises (M1) constructing a three-dimensional model divided into a plurality of small elements representing at least part of an injection molded product, (M2) determining the flow conductances κ of the injection molded material at the respective small elements, based on the flow thicknesses of the injection molded product at said respective small elements, (M3) obtaining flow velocities of the injection molded material at the respective small elements based on the determined flow conductances κ, and (M4) analyzing the injection molding process of the injection molded product in reference to the found flow velocities.

A further other embodiment of the method for analyzing an injection molding process of the present invention comprises (N1) constructing a three-dimensional model divided into a plurality of small elements representing at least part of an injection molded product having a thin portion and a thick portion, (N2) (N2-1) determining the flow conductance κ of the injection molded material in the small elements in the thin portion, based on the thickness of the thin portion, and (N2-2) determining the flow conductance κ of the injection molded material in the small elements in the thick portion, based on the function F(R, η) which increases with the increase of the minimum distance R between the small element and the mold surface and decreases with the increase of the viscosity η of the injection molded material, (N3) finding pressures of the injection molded material at the respective small elements based on the determined flow conductances κ, and (N4) analyzing the injection molding process of the injection molded product in reference to the found pressures.

A still further other embodiment of the method for analyzing an injection molding process of the present invention comprises (O1) constructing a three-dimensional model divided into a plurality of small elements representing at least part of an injection molded product, (O2) (O2-1) determining the flow conductance κ of the injection molded material in the small elements in the thin portion, based on the thickness of the thin portion, and (O2-2) determining the flow conductance κ of the injection molded material in the small elements in the thick portion, by solving the following formula:

$$\frac{\partial^2 \kappa}{\partial x^2} + \frac{\partial^2 \kappa}{\partial y^2} + \frac{\partial^2 \kappa}{\partial z^2} = -\frac{1}{\eta}$$

(where η is viscosity of the injection molded material, and x, y and z express the position of said small element), (O3) finding pressures of the injection molded material at the respective small elements based on the determined flow conductances κ, and (O4) analyzing the injection molding process of the injection molded product in reference to the found pressures.

The method for producing an injection molded product of the present invention comprises (P1) determining the injection molding conditions of an injection molded product having a thin portion and a thick portion, (P2) constructing a three-dimensional model divided into a plurality of small elements representing at least part of the injection molded product, (P3) (P3-1) determining the flow conductance κ of the injection molded material in the small elements in the thin portion, based on the thickness of the thin portion, and (P3-2) determining the flow conductance κ of the injection molded material as a small value when the small elements in the wide portion are located close to the mold surface, for determining the flow conductance κ of the injection molded material as a large value when the small elements in the thick portion are located far from the mold surface, (P4) finding pressures of the injection molded material at the respective small elements based on the determined flow conductances κ, (P5) finally determining the injection molding conditions based on the distribution of the found pressures, and (P6) producing the injection molded product based on the finally determined injection molding conditions.

Another embodiment of the method for producing an injection molded product of the present invention comprises (Q1) determining the injection molding conditions of an injection molded product having a thin portion and a thick portion, (Q2) constructing a three-dimensional model divided into a plurality of small elements representing at least part of an injection molded product having a thin portion and a thick portion, (Q3) (Q3-1) determining the flow conductance κ of the injection molded material in the small elements in the thin portion, based on the thickness of the thin portion, and (Q3-2) determining the flow conductance κ of the injection molded material as a small value when the small elements in the thick portion are located close to the mold surface, for determining the flow conductance κ of the injection molded material as a large value when the small elements in the thick portion are located far from the mold surface, (Q4) finding pressure transitions of the injection molded material at the respective small elements based on the determined flow conductances κ, (Q5) finally determining the injection molding conditions based on the distribution of the found pressure transitions, and (Q6) producing the injection molded product based on the finally determined injection molding conditions.

A further other embodiment of the method for producing an injection molded product of the present invention comprises (R1) determining the injection molding conditions of an injection molded product having a thin portion and a thick portion, (R2) constructing a three-dimensional model divided into a plurality of small elements representing at least part of an injection molded product, (R3) (R3-1) determining the flow conductance κ of the injection molded material in the small elements in the thin portion, based on the thickness of the thin portion, and (R3-2) determining the flow conductance κ of the injection molded material as a small value when the small elements in the wide portion are located close to the mold surface, determining the flow conductance κ of the injection molded material as a large value when the small elements in the thick portion are located far from the mold surface, (R4) finding flow velocities of the injection molded material at the respective small elements based on the determined flow conductances κ, (R5) finally determining the injection molding conditions based on the distribution of the found flow velocities, and (R6) producing the injection molded product based on the finally determined injection molding conditions.

In a preferable embodiment of the method for producing an injection molded product of the present invention, said injection molding conditions contain at least one of the shape of the injection molded product, mold configuration, injection speed, injection temperature, mold temperature and injection molded material.

DESCRIPTION OF THE PREFERRED EMBODIMENTS

Preferable embodiments of the apparatus and method for analyzing an injection molded process are described below in detail in reference to drawings as examples of the apparatus and method for analyzing a fluid flow process of the present invention. Furthermore, a preferable embodiment of the method for producing an injection molded product is also described.

Figure 1:
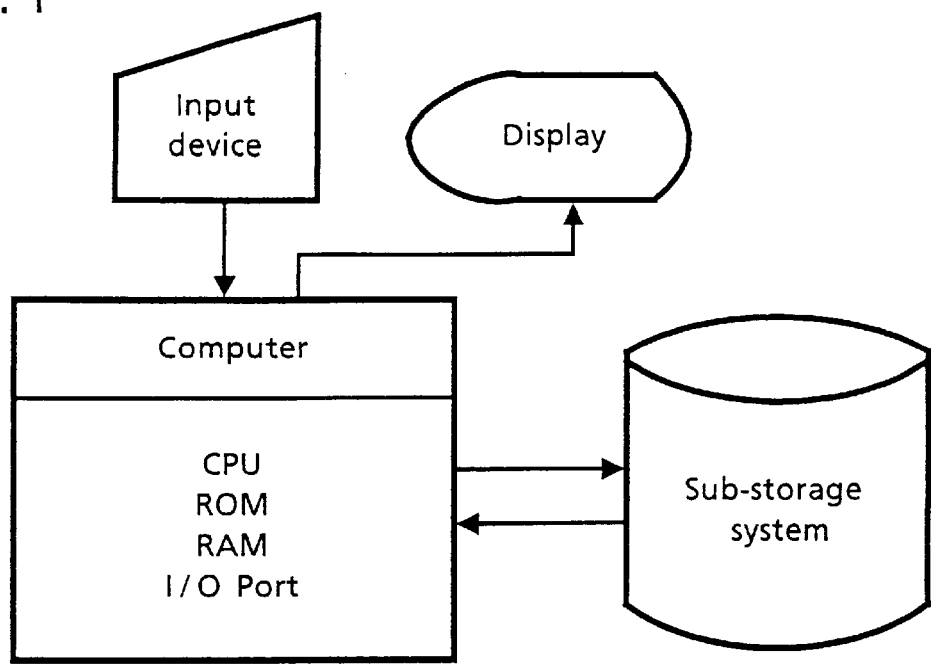
FIG. 1 is a chart showing a hardware configuration of the apparatus for analyzing a fluid flow process (injection molding process) of the present invention.

FIG. 1 is a chart showing a hardware configuration of the apparatus for analyzing an injection molded process of the present invention. A computer 101 is connected with an input device 103, a display 104 and a sub-storage system 102. The input device 103 is used to enter, for example, the injection molding conditions of the injection molded product to be analyzed, and the data of the three-dimensional model, and these data are stored in the sub-storage system 102. The operator instructs the computer 101 to read these data into its internal RAM (random access volatile memory), for analysis. The obtained analyzed results are displayed, for example, on the display 104. As required, the operator can change the injection molding conditions, for re-analyzing based on the change. The analyzed results can also be delivered onto a printer provided separately, or stored in the sub-storage system 102. In this case, the analyzed results can also be used as input data of another analyzer.

Figure 2:
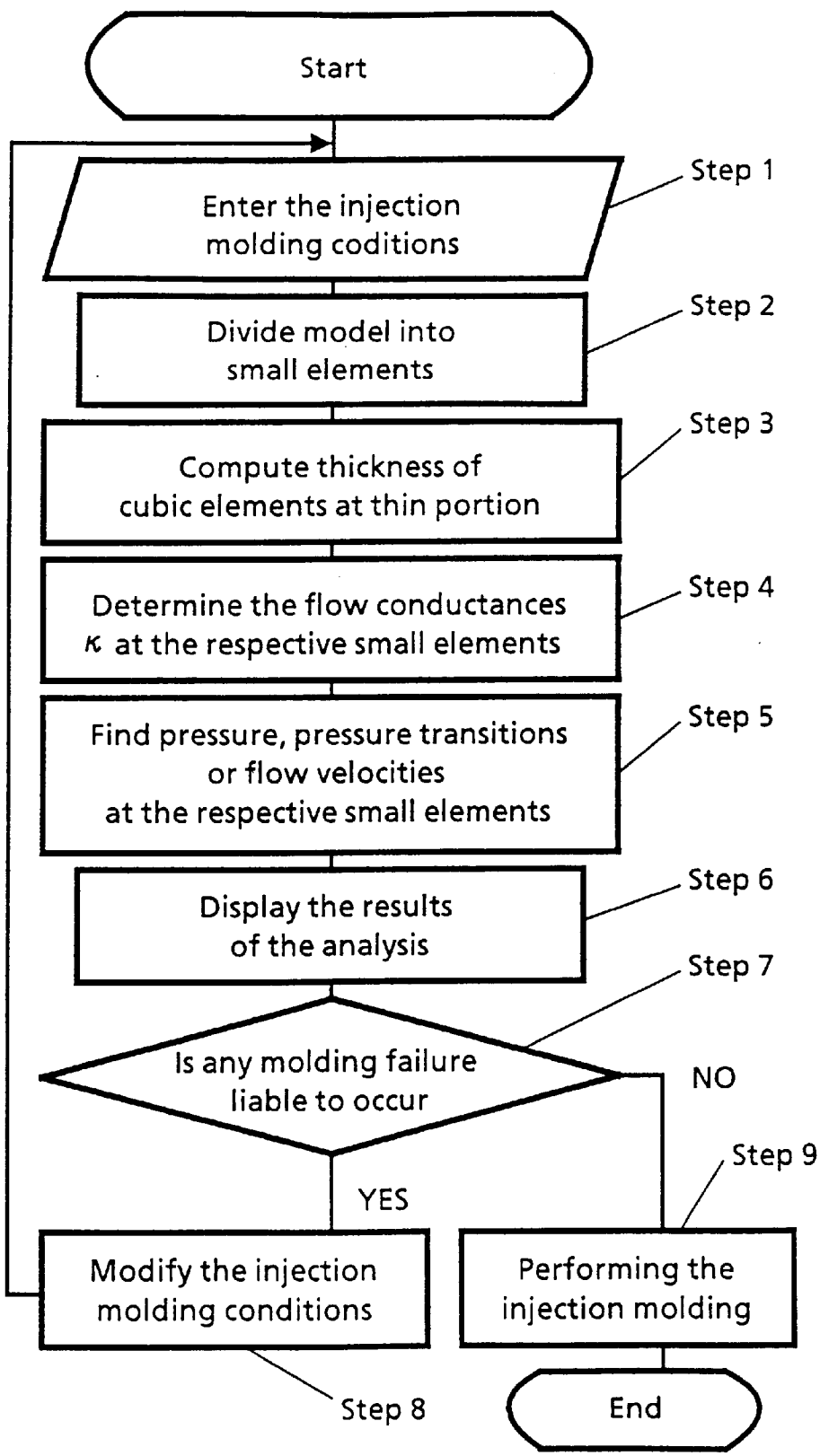
FIG. 2 is a chart showing a procedure of the method for analyzing an injection molding process and the method for producing an injection molded product, respectively of the present invention.

FIG. 2 is a chart showing a procedure of the apparatus and method for analyzing an injection molding process of the present invention, and also of the method for producing an injection molded product using the apparatus.

Figure 6:
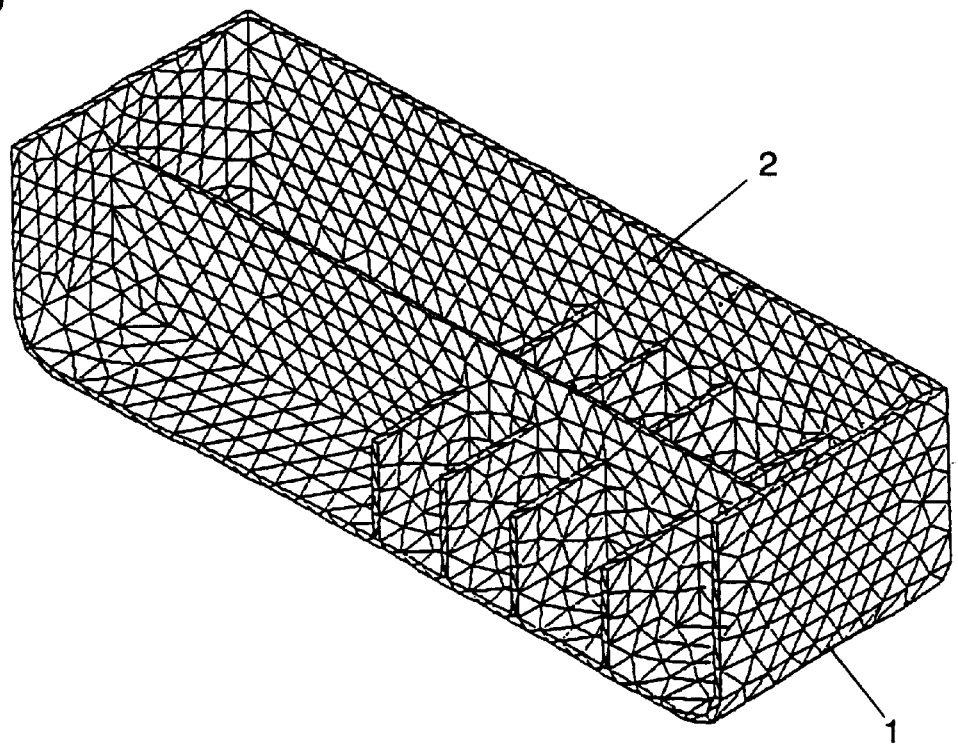
FIG. 6 is a perspective view showing how small elements are determined in an example of the present invention.

In the analysis of an injection molding process, at first, the injection molding conditions of an injection molded product (e.g., the shape of the injection molded product, mold configuration, injection speed, injection temperature, mold temperature, injection molded material, etc.) are entered (Step 1). Then, the shape (plastic case 1) is divided into cubic small elements 2 for example as shown in FIG. 6, to construct a three-dimensional model of the product (Step 2).

Subsequently, the thickness of a thin portion divided in three-dimensional small element is set (Step 3). Then, the flow conductances κ of the respective small elements are decided (Step 4). The flow conductances κ decided in Step 4 are then used to obtain pressures of the injection molded material (hereinafter called "material pressures") at the respective small elements (Step 5). In this step, the pressure transitions of the respective small elements may be obtained. As a further alternative, the flow velocities of the injection molded material at the respective small elements may be obtained from the distribution of the obtained material pressures or directly. The analyzed results obtained like this are, for example, graphically processed, to be expressed as contour lines or graph, etc. (Step 6). The results can also be delivered to a printer, etc.

When these analyzed results of the injection molding process are used for producing an injection molded product, the pressures, pressure transitions or flow velocities obtained as above are evaluated (Step 7). The evaluation is effected by judging that a molding failure is highly likely to occur if there is any region containing an abnormal pressure, pressure transition or flow velocity. If any molding failure is predicted to occur from the analyzed results obtained, the injection molding conditions are modified (Step 8), and analysis is effected again from Step 1. Steps are repeated like this, and if the results allow a prediction that good injection molding can be effected, the injection molding conditions are used for injection molding, to produce the injection molded product (Step 9).

When a three-dimensional model is constructed, shape data may be manually entered by an operator, but it is preferable to use the CAD data used for designing the injection molded product.

In this case, either the cubic information data or surface data of CAD can be used. The cubic information data comprise detailed information such as the procedure for designing by use of CAD, various points, surfaces, volumes, etc., and have a format specified for each CAD device.

On the other hand, the surface data correspond to only the shape data of the external surface among the cubic information, and many CAD devices have a function to deliver the surface data only.

Presently available surface data include STL format data used in an optical shaping technique to prepare a model with an intended shape using a photosetting resin, etc. from electronic shape information of CAD, etc. The STL format data are the coordinates of vertexes of a set of triangles delivered to approximate a cubic surface shape such as a curved surface.

Ordinary CAD data, especially cubic information, are low in interchangeability between software programs, and even the same software program can be different from version to version. So, their handling is complicated. In this regard, surface data are generally relatively simple and easy to handle. It is preferable to decide the three-dimensional shape of a cavity using the CAD data, surface data, etc., and to automatically decompose it into small elements by a preprocessor, etc. which can calculate according to the infinite element method.

The method for obtaining the material pressures, pressure transitions and flow velocities at the respective small elements is described below in detail.

For obtaining material pressures in injection molding, the generally known continuity equation (1) is used. The equation (1) expresses that the sum of the inflow rates and the outflow rates of a fluid in a given region is zero, and holds on the assumption that the fluid is incompressible. When the fluid is compressible, the right side is not zero, but the following discussion holds similarly.

$$\frac{\partial U}{\partial x} + \frac{\partial V}{\partial y} + \frac{\partial W}{\partial z} = 0 \quad (1)$$

where x, y and z are three-dimensional space coordinates, and U, V and W are flow velocities of the injection molded material in the respective coordinate axis directions. The equation (1) has U, V and W as unknown variables, and in general, it is said necessary to solve a momentum equation with this equation and the shear stress derived from pressure P and a flow velocity as unknown variables, and when three-dimensional flow is handled, the number of unknown variables is four.

To solvent the equation (1), if the following equation (2) is used to erase the flow velocities U, V and W in the respective directions from the equation (1), the number of unknown variables can be decreased from four to one only of pressure, to greatly decrease the computing time. In this case, the computing time with the use of a three-dimensional model can be decreased to about $\frac{1}{16}$, and the required RAM volume of the computer can be decreased to about $\frac{1}{4}$. Thus, for the first time, the analysis of a three-dimensional molding process with a practical speed and accuracy can be achieved.

$$U = -\kappa \frac{\partial P}{\partial x}, \quad V = -\kappa \frac{\partial P}{\partial y}, \quad W = -\kappa \frac{\partial P}{\partial z} \quad (2)$$

where κ is the flow conductance. The equation (2) is called the equation of Darcy's flow and expresses a porous flow. That is, it is assumed that the flow velocities U, V and W in the three-dimensional coordinate axis directions x, y and z are proportional to the pressure gradients, etc. in the respective directions.

If the equation (2) is substituted into the equation (1), the following equation (3) can be obtained.

$$\kappa \left( \frac{\partial^2}{\partial x^2} + \frac{\partial^2 P}{\partial y^2} + \frac{\partial^2 P}{\partial z^2} \right) = 0 \quad (3)$$

The equation (3) has the same form as that of an equation expressing general thermal conduction. In a thermal conduction problem, if the temperature T or temperature gradient of a boundary is preset as a boundary condition in a given region divided into small elements, the temperature distribution in the region can be obtained by a numerical analysis method such as finite element method, finite difference method or control volume method, etc. Therefore, if pressure P or pressure gradient of a boundary is set as a boundary condition for a given region divided into small elements, the equation (3) can be similarly solved by using a method or program for analyzing a thermal conduction problem, and the pressure distribution of a material can be obtained.

For setting the boundary condition, for example, at a material inflow portion, the pressure gradient obtained from the injecting pressure or injecting flow rate is set, and at a boundary in contact with the mold surface, the pressure gradient is set as zero since there is neither inflow nor outflow. Furthermore, the pressure at the flow front portion with a free surface is set, for example, at atmospheric pressure.

In injection molding, since the material filled portion increases with time, the pressure distribution also changes with time. The temporal change of pressure distribution (distribution of pressure transitions) can be obtained by obtaining the shape of the filled region in relation with the total amount of the material newly filled and solving the equation (3) again. For obtaining the change in the shape of the filled region, the control volume method or FAN method (flow analysis network method), etc. used in the conventional method for analyzing an injection molding process can be used.

The flow velocities can be simply obtained, for example, by obtaining the pressure distribution P as described above, and substituting it into the equation (1).

The method for determining the flow conductances κ in Step 2 of FIG. 2 is described below in detail.

At first, the method for obtaining the flow conductances κ of a thin portion is described below.

Figure 12:
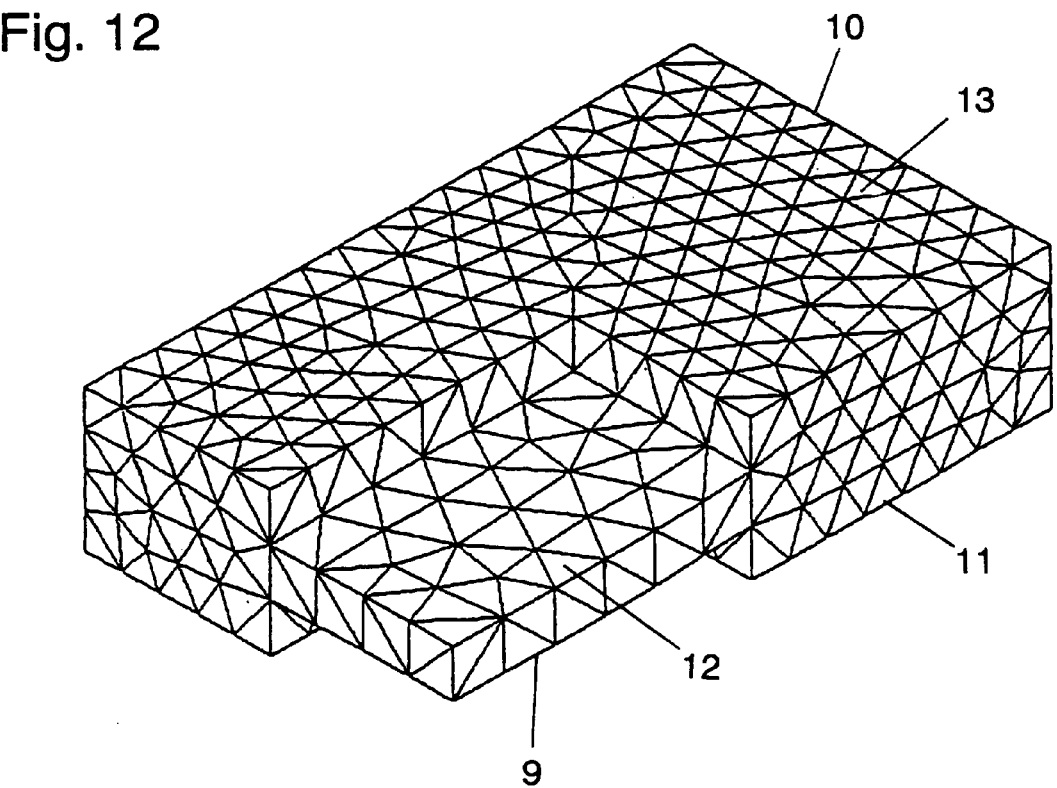
FIG. 12 is a perspective view show how small elements are determined in an example of the present invention.

Also for constructing a three-dimensional model, in a very thin portion compared to a thick portion, it is often practiced that the small elements constituting the thin portion form a one-layer structure as shown in FIG. 12. When the small elements are triangular pyramids, the one-layer structure refers to a structure in which one face of each triangular pyramid and the vertex not contained in the face simultaneously contact the cavity. When the small elements are hexahedrons, the one-layer structure refers to a structure in which two opposite faces of each small element contact the cavity.

A two-layer structure refers to a structure in which both one small element and another small element in contact with any one of its vertexes and faces contact the cavity respectively at any one of their faces or vertexes.

The reason why the one-layer structure is frequently adopted is that if a thin portion is divided to form a structure with many layers (say, four or more layers) or to form a purely three-dimensional structure like a general thick portion, the region is divided into unnecessarily very small elements, to form a model consisting of very many small elements, not allowing analysis within a practical computing time.

Especially when a pre-processor for automatically dividing a molded product into many three-dimensional small elements to construct a three-dimensional model is used, a thin portion is mostly divided in one or two layers. In this case, at Step 3 of FIG. 2, the thickness of the thin portion is obtained, and the flow conductances κ of the region are obtained at Step 4 from the following equation (4):

$$U = -\kappa \frac{\partial P}{\partial x}, \quad V = -\kappa \frac{\partial P}{\partial y}, \quad \kappa = \frac{H^2}{12\eta} \quad (4)$$

where H is the thickness of the material flow channel, and η is the material viscosity.

At Step 3, the thickness can be set, for example, by any of the following methods.

(i) The thickness data of three-dimensional CAD data for a thin portion are used. This method is especially effective for a portion with a thickness set by three-dimensional CAD such as a rib, and allows an accurate thickness to be set.

(ii) For three-dimensional small elements of a thin portion, thickness data are separately entered. In this method, the effort of input is necessary, but thin elements can be reliably selected.

(iii) For three-dimensional small elements of a thin portion, for example, if the thin portion is of one-layer structure and the three-dimensional small elements are triangular pyramids, then the area S exposed on the surface (in contact with the mold or cavity) of a triangle and the volume V of the triangular pyramid are calculated, to calculate the thickness as H=3V/S. If two or more faces of a three-dimensional element are exposed on the surface, H values are obtained for the respective faces, and the minimum value of them is adopted. In this method, the thickness can be automatically obtained. When three-dimensional small elements are hexahedrons, the area S of the face exposed on the surface and the volume V of the hexahedron are calculated, to calculate the thickness as H=V/S. When a plurality of faces are exposed on the surface, similar calculation is effected for the respective exposed faces, and the average value is used. In the case of a two- or more-layer structure, the thicknesses of the respective layers are calculated and added.

(iv) For three-dimensional small elements of a thin portion, the normal line of the face exposed on the surface is assumed, and the distance of the normal line passing through the model in the thin portion (the distance from the intersection between the normal line and the exposed face to the intersection with the face of the thin portion of the model in opposite to said surface) is adopted as the thickness. In this case, since the thickness is obtained based on the face exposed on the surface, of a small element, it is not affected by any deformation of the small element. In this regard, this method is more excellent than the method of (iii).

(v) The above mentioned surface data delivered from CAD used for defining the cavity configuration are used, to define the distance of the normal line of the surface of the thin portion through the model as the thickness as in (iv). As described before, many CAD devices have a function to deliver the three-dimensional configuration of the surface of a three-dimensional cavity especially as surface data, and as described before, surface data are mostly relatively simple and easy to handle.

A method for obtaining flow conductances κ of a thick portion is described below.

The inventors found that the flowability of an injection molded material is higher when the material is farther away from the mold surface and lower when closer to it. Therefore, it is generally preferable to determine the flow conductance as a smaller value when the small element is closer to the mold surface (i.e., cavity wall), and as a larger value when farther away from it. So, if it is assumed that the flow conductance κ changes according to a function showing such a tendency, a more approximate value can be obtained by analysis. That is, it is preferable to use the following equation (5) for the flow conductance κ in such a case.

$$\kappa = F(R, \eta) \quad (5)$$

where R is the minimum distance from the center of gravity of each small element to the mold surface, or the minimum distance from the vertex of each small element to the mold surface, and η is the material viscosity.

The function F of the equation (5) increases the flow conductance κ when the material is farther away from the mold surface, i.e., when R is larger, since the effect of friction force between the mold and the material becomes lower, and decreases the flow conductance κ when the material viscosity η is larger since the flowability is lower. For example, it is defined as a function to increase κ with the increase of R and decreases κ with the increase of η like κ=aR/η+b. In this case, a is a positive proportional coefficient, and b is a coefficient showing the flow conductance at R=0, i.e., at the mold surface. These constants a and b are decided by an experiment using a typical injection molded product, etc. The linear equation concerning R/η shown here has a feature that the computing time can be short, as the simplest mode for expressing the function F. Furthermore, any other form of equation can also be used, which allows the analyzed result to agree with the result of actual molding, depending the type of the injection molded product.

The viscosity η changes depending on the temperature, shear rate, etc., and can be approximated by equation (6). In the equation, A, B and C are coefficients peculiar to the material, and can be experimentally obtained using a viscosity measuring instrument. If the approximate value of the viscosity by the equation (6) is substituted into the equation (4) or (5), the influence of the change of viscosity caused by the changes of shear rate and temperature can also be simply incorporated in the calculation of flow conductance.

$$\eta = A \times (\text{Shear rate})^B \times exp(C \times \text{Temperature}) \quad (6)$$

The flow conductance κ can also be obtained as described below.

The inventor found a method of obtaining the flow conductance κ by solving the differential equation shown as equation (7). In the equation, x, y and z are three-dimensional coordinate axes of space, and η is the material viscosity.

$$\frac{\partial^2 \kappa}{\partial x^2} + \frac{\partial^2 \kappa}{\partial y^2} + \frac{\partial^2 \kappa}{\partial z^2} = -\frac{1}{\eta} \quad (7)$$

The inventor found that the flow conductance can be obtained by substituting the first equation of the formulae (2) into the equation (8) expressing the balance of forces in a flow field where viscous force is dominant, to erase the flow velocity U, and furthermore omitting the second order derivative terms concerning x, y and z of pressure P. By omitting the second order derivative terms, κ can be obtained by the simple method described below.

$$\eta \left( \frac{\partial^2 U}{\partial x^2} + \frac{\partial^2 U}{\partial y^2} + \frac{\partial^2 U}{\partial z^2} \right) = \frac{\partial P}{\partial x} \quad (8)$$

The equation (7) has the same form as that of an equation expressing general thermal conduction. It is known that for a problem of thermal conduction, if the temperature T or temperature gradient of a boundary preset as a boundary condition for a region with an arbitrary shape, the temperature distribution in the region can be obtained by a numerical analysis method such as finite element method, boundary element method, finite difference method or control volume method, etc. Therefore, if the equation (7) is solved by setting a boundary condition that the κ at the mold surface as the boundary is zero, the distribution in which κ is smaller at a position closer to the mold surface and is larger at a position farther away from it can be obtained by using a method or program for analyzing a thermal conduction problem. The boundary condition of κ=0 corresponds to the assumption that the velocity at the mold surface is 0, as can be seen from the equation (1). The slip of the material on the mold surface can be taken into account, by using a small value not zero such as κ=0.01 mm² (Pa.sec) for substitution.

Furthermore, if the approximate viscosity by the equation (6) is substituted into the equation (7), the influence of the change of viscosity caused by the changes of shear rate and temperature can also be simply incorporated into the calculation of flow conductance.

According to this method, though the computing time becomes longer because of the necessity to solve an equation of thermal conduction, compared to the method of determining the flow conductance κ using the equation (5), the flow conductance can be obtained accurately for an arbitrary shape. Furthermore, as described above, since the equation (7) has been derived based on the equation (8) expressing the balance of forces in a flow field wherein viscous force is dominant, the values obtained are higher in physical consistence than those obtained by the method using the equation (5). Therefore, always accurate results of analysis can be obtained without being affected by the shape of the injection molded product, the model divided into small elements, etc.

Figure 3:
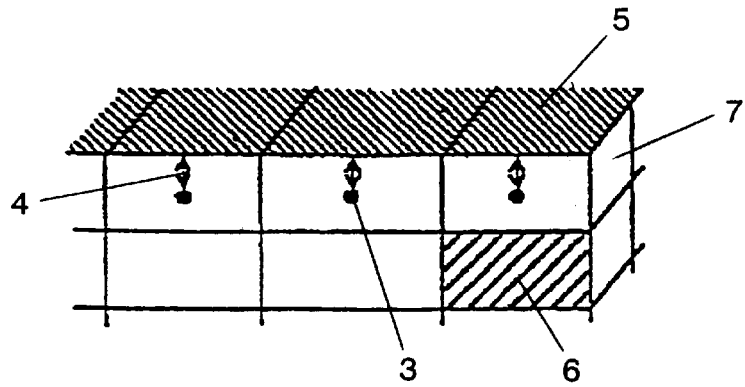
FIG. 3 is a conceptual perspective view showing a method for determining the flow conductances used in the present invention.
Figure 4:
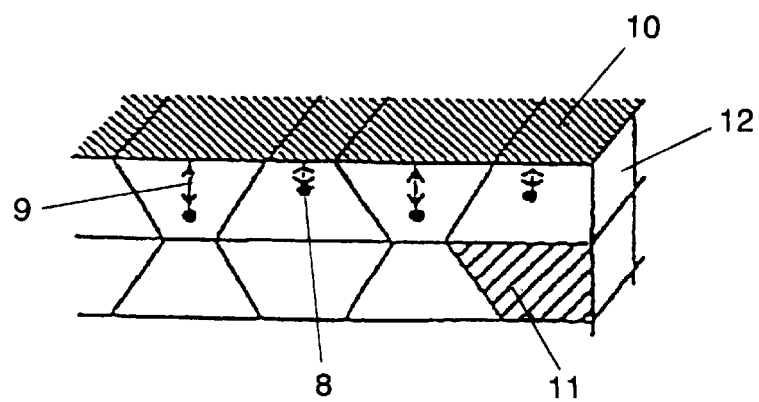
FIG. 4 is a conceptual perspective view showing another method for determining the flow conductances used in the present invention.

For example, of small elements 7 or 12 with a sectional form 6 or 11 as shown in FIGS. 3 or 4, if the flow conductances are decided according to the method using the equation (5) when the small elements 7 are regularly formed as shown in FIG. 3, flow conductances can be decided accurately at a high speed since the minimum distances 4 from the centers 3 of gravity of the respective elements to the mold surface 5 are constant, but when the adjacent small elements 12 are irregularly formed as shown in FIG. 4, flow conductances obtained may be inaccurate since the minimum distances from the centers 8 of gravity of the adjacent elements are not constant. However, this inaccuracy can be eased, for example, by using the mean value of the distance between the vertex closest to the wall and the wall and the distance between the vertex farthest from the wall and the wall, as R.

The above method for determining the flow conductances in a thick portion is especially effective when the small elements of the three-dimensional model take a four- or more-layer structure or a pure three-dimensional structure. On the other hand, for a region where the small elements contained in the portion concerned of the constructed three-dimensional model form, for example, a three- or less-layer structure, it is recommended to use said method for determining the flow conductances in a thin portion. Especially in the case of a one-layer structure as shown in FIG. 12, the method for a thin portion should be used.

In general, the division into small elements to be used for numerical analysis can be automatically effected by software called a pre-processor, and according to this method, a complicatedly shaped product with many protrusions and holes can also be easily divided. In the case of such automatic division, in general, the forms of small elements become irregular, but according to the method using the equation (7), the influence of the forms of small elements can be minimized. So, even if a complicatedly shaped injection molded product is automatically divided, highly accurate analysis is possible. In addition to the above, there are various other methods for determining the flow conductances, and especially for any specific shape, a method to realize high computational accuracy and computational speed can be considered.

The method for producing an injection molded product by analyzing the injection molding process as above, and determining the injection molding conditions based on the results is described below.

The distribution of pressures, pressure transitions or flow velocities of an injection molding material for producing an injection molded product under the injection molding conditions given as described above can be obtained. In this case, the results can be used for determining or modifying the injection molding conditions as described below.

Generally in injection molding, to obtain a molded product less strained at a low stress, it is desirable that the pressures of the material are as low as possible, and it is preferable that the pressure gradient is free from any extremely sharp portion or extremely gentle portion and as even as possible. Also in the temporal transitions of pressure, the occurrence of a peak pressure caused by any sharp pressure rise is not preferable. If such a pressure criterion is applied, the quality of molding state can be judged. Furthermore, it is preferable to apply a criterion based on the flow velocities obtained as described above.

The molding state can also be judged based on the flow velocity gradients, shear rates, shear stresses, progression pattern of filled region, etc. These data can be simply obtained by processing the information on the distribution of pressures, pressure transitions or flow velocities obtained according to the above mentioned method. For example, with the velocity gradient between small elements as the shear rate, if the shear rate is multiplied by the viscosity, the shear stress can be obtained. Furthermore, from the velocity at the flow front, the portion to be filled next can be decided one after another, to analyze the progression pattern of the filled region.

If any failure is anticipated in the above judging method, the mold design, product design, molding conditions or material used can be modified to produce an injection molded product free from any failure.

As a first method of modification, the mold configuration is modified to modify the material flow channel, etc. The mold configuration in this case generally means the material flow channel ranging from the injection nozzle of the material called a spur, runner or gate to the cavity. For example, if it is judged that the flow length from the nozzle to the end of cavity is so long as to cause a very large pressure loss, the runner can be divided to use a plurality of gates for allowing the material to flow into the cavity, to shorten the flow length.

As a second method of modification, the shape of the injection molded product is modified to modify the material flow channel. For example, if the pressure gradient in the cavity is large, and it is anticipated that the flow strain becomes large, the thickness of the product can be increased to lower the pressure gradient.

As a third method of modification, a molding condition such as injection speed, material temperature or mold temperature, etc. is changed. For example, if it is anticipated that the pressure rise at a material inlet at a certain time is so remarkable as to cause difficult molding, the pressure rise can be decreased by lowering the injection speed at the time or raising the material temperature or mold temperature.

As a fourth method of modification, the injection molded material is changed. For example, if it is anticipated that the material pressure loss is so large as to cause difficult molding, a more flowable material with a lower viscosity can be selected to decrease the pressure loss.

Any one or more as a combination of the above modification methods can be used. It is preferable to use an expert system, etc. for automatically carrying out the above modification.

The injection molding conditions are re-examined as described above, and the apparatus for analyzing an injection molding process is used again to analyze under the conditions to give preferable injection molding results. This operation is repeated till injection molding conditions to give the optimum results are found. If the injection molding conditions to give the optimum results have been found, injection molding is effected under the conditions, to produce the intended injection molded product.

The present invention can be applied to any shapes of injection molded products in principle, but is especially effective for products likely to manifest the effect of a three-dimensional configuration.

A product likely to manifest the effect of a three-dimensional configuration refers to a thick part as thick as more than 5 mm or a small part as thin as about 1 to 2 mm but with a total product dimension of about 10 mm, in which the influence of the flow in the thickness direction is likely to be relatively dominant. Furthermore, for local flow in a region where the flow suddenly changes in the thickness direction like a fluid flow at a step shape part or corner shape part, three-dimensional analysis is effective.

The mold used in the present invention is a metallic mold produced by a precision machining means such as electric discharge machining.

The apparatus and method for analyzing a fluid flow process of the present invention can be preferably used for analyzing not only an injection molding process but also the flow process of a general fluid. For example, they are especially suitable for analyzing the flow process of a three-dimensionally flowing fluid such as the material flow in an extrusion die, the flow in an extruder screw channel, or the flow in a kneading machine.

That is, they can be applied to obtain the distribution of pressures, pressure transitions or flow velocities of a material during extrusion flow in a die for extrusion molding of a round bar or flat plate or profile extrusion. At a portion where the pressure gradient or flow velocity is close to 0, the material may be retained or thermally degraded, to lower the quality of the molded product. So, extrusion molding conditions such as die configuration must be decided not to cause retention. The present invention is suitable for such applications.

Also for the screw of an injection molding machine or extrusion molding machine, the present invention can be applied to decide the conditions for a screw design with less retaining portions, etc. The present invention can also be used for calculating the distribution of shear stresses in the screw channel of an extruder type kneading machine for maximizing the shear stress.

EXAMPLES

Examples of the apparatus and method for analyzing an injection molding process as embodiments of the apparatus and method for analyzing a fluid flow process of the present invention, and also an example of the method for producing an injection molded product of the present invention are described below in detail in reference to drawings.

Example 1

Figure 5:
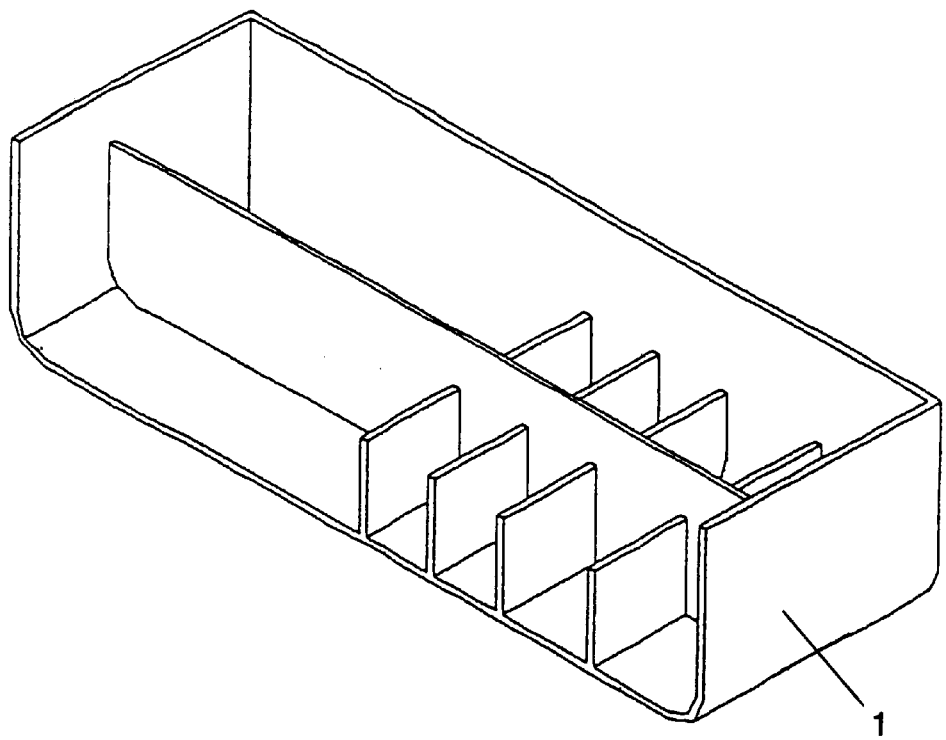
FIG. 5 is a perspective view showing an injection molded product to be analyzed in an example of the present invention.

In this example, an application to an injection molded product (plastic case) 1 as shown in FIG. 5 is described.

At first, at Step 1 of FIG. 2, injection molding conditions (ABS resin as the material used, 250° C. in injection temperature, 50° C. in mold temperature, 2 seconds in fill time) were entered. Then, at Step 2, the shape of the injection molded product 1 was divided into a plurality of three-dimensional small elements 14 as shown in FIG. 6, to construct a three-dimensional model of the injection molded product 1. In this example, the three-dimensional small elements were automatically formed using the automatic element forming function of a finite element method preprocessor based on the data of the three-dimensional CAD data used for the product design. The time taken for element formation using an engineering work station was about 3 minutes. As mentioned before, similar results can be obtained even if the surface data of CAD are used.

In succession, at Step 3 of FIG. 2, the thicknesses H of the thin portions were calculated. The thicknesses H were automatically obtained from H=3 V/S, where V was the volume of a three-dimensional element and S was the area of the face in contact with the cavity. Since the molded product 1 of this example had a thin structure as a whole, the thicknesses H (2 to 3 mm) were obtained for all the small elements according to this method. At Step 4, using the values of H, flow conductances κ were obtained from the equation (4). The same thickness values can be obtained even if the distance for the normal line of an element on the surface to pass through the model obtained from CAD data or CAD surface data is used.

Figure 7:
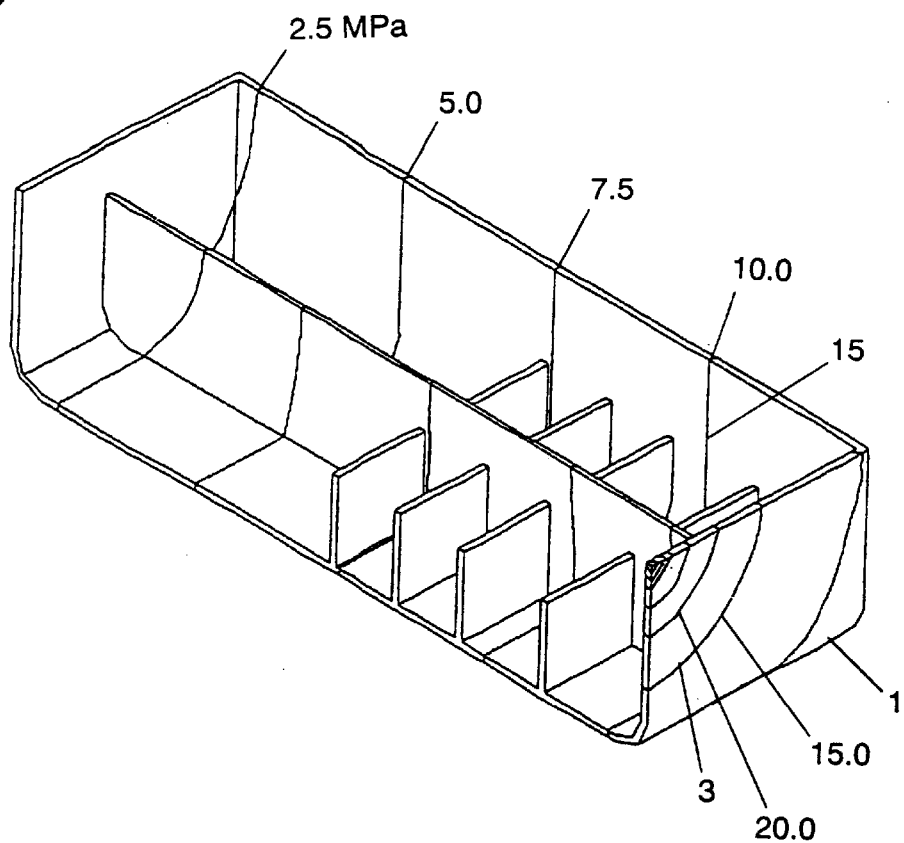
FIG. 7 is a perspective view showing a calculation result on the distribution of pressures of the material of an injection molded product in an example of the present invention.

In succession at Step 5 of FIG. 2, based on the flow conductances κ, the equation (3) was solved using a numerical computation program as used for analysis of thermal conduction, to obtain a distribution of pressures during injection molding at respective small elements. Actually, based on the results of Step 5, the flow conductances at Step 4 were determined again, to obtain the values of the next moment repetitively. At Step 6, the results were graphically processed, to obtain a pressure distribution as shown in FIG. 7. In this case, the pressures (2.5 MPa to 20.0 MPa) of respective small elements were expressed by contour lines 3. The series of computation from Step 2 was completed in about 40 minutes using an engineering work station.

Figure 8:
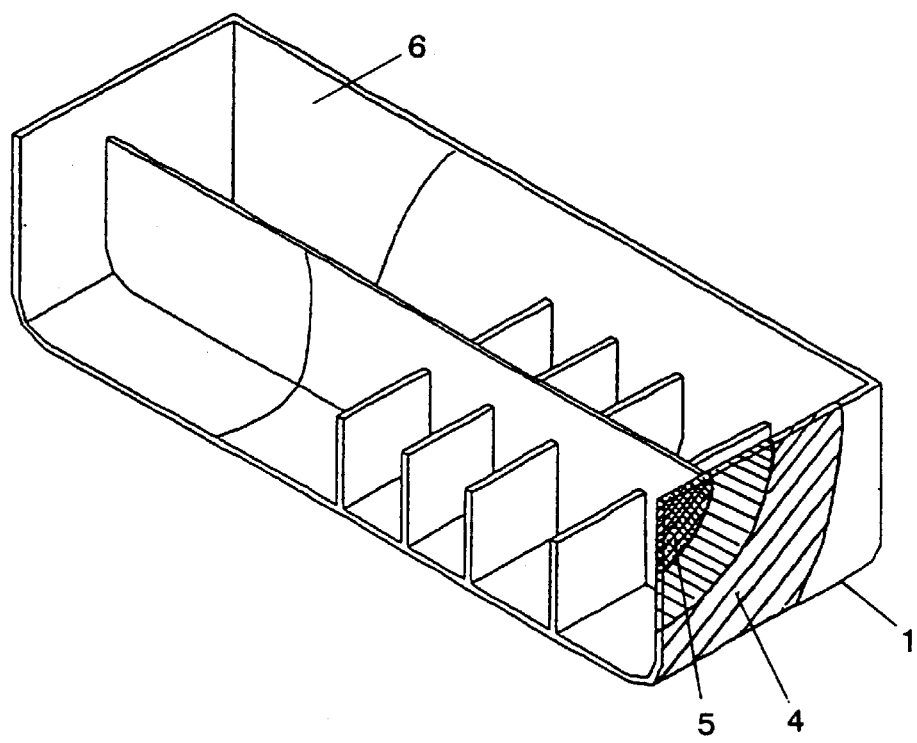
FIG. 8 is a perspective view showing a calculation result on the pressure transitions of the material of an injection molded product in an example of the present invention.
Figure 9:
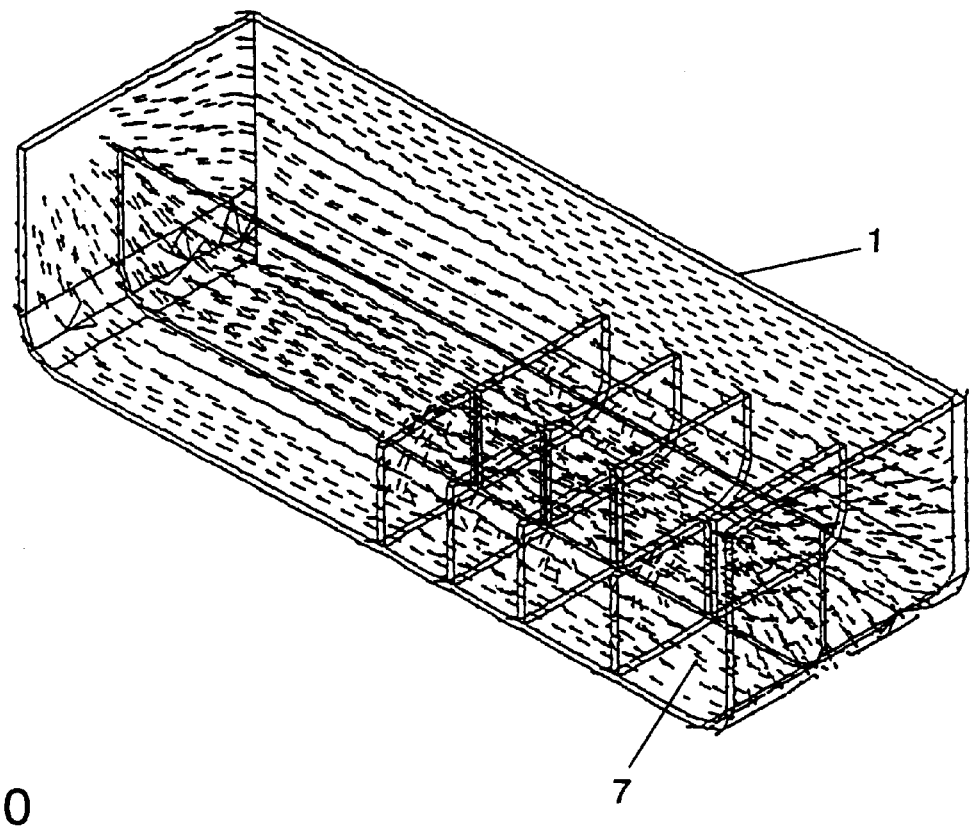
FIG. 9 is a respective view showing a calculation result on the flow velocities of the material of an injection molded product in an example of the present invention.

Based on the obtained pressure distribution, furthermore a pressure transition distribution 4 (portions large in pressure transition 5, and portions small in pressure transitions 6) as shown in FIG. 8, and a flow velocity distribution 7 as shown in FIG. 9 were obtained. Moreover, a shear stress distribution, etc. were also obtained. According to the analyzed results obtained, the maximum pressure transition was 30 MPa/sec and the flow velocities ranged from 30 to 200 mm/sec. The shear stresses were 10,000 Pa or less. Since it was judged that the injection molding conditions had no problem, the injection molded product was produced. The produced injection molded product was excellent in such properties as strength since it was produced under optimum conditions.

If any molding failure is anticipated due to an extreme pressure gradient portion, etc., the shape of the molded product, molding conditions, material, etc. can be modified, to repeat the respective steps from Step 1, for obtaining proper product design, mold design, molding conditions, etc.

Comparative Example 1

Figure 10:
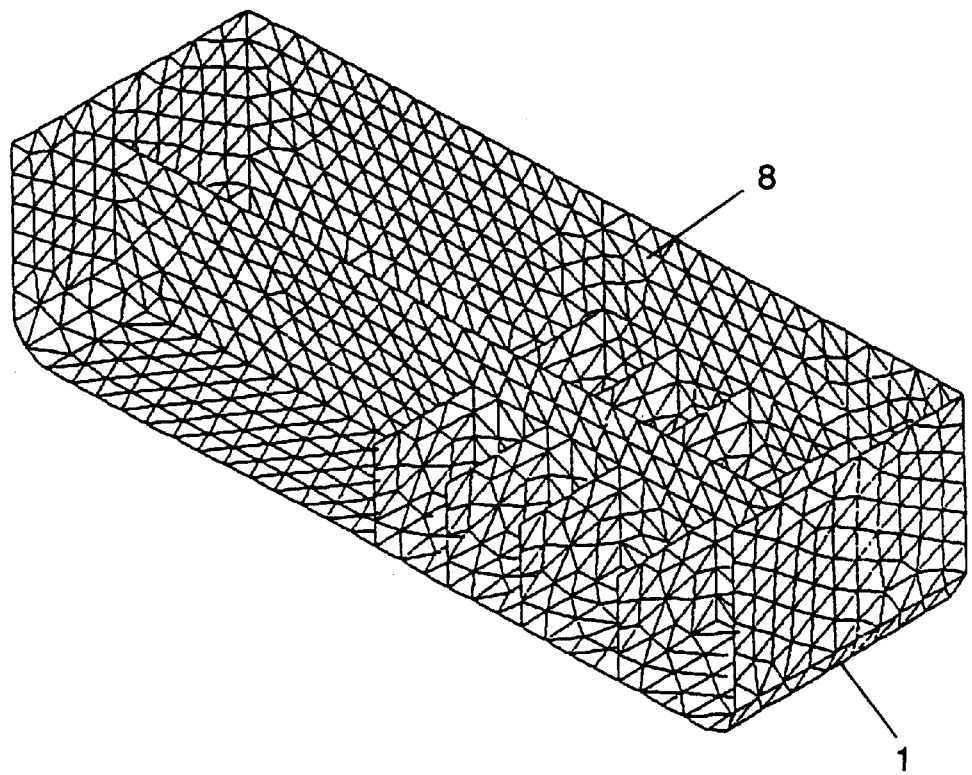
FIG. 10 is a perspective view showing the injection molded product of FIG. 5 modeled according to a conventional method.

The same injection molded product 1 as analyzed in Example 1 was analyzed as described in Example 1, except that a two-dimensional model as shown in FIG. 10 was constructed. The model was constructed by re-defining the neutral faces in the thickness direction of respective portions with three-dimensional forms, dividing the re-defined neutral faces into two-dimensional small elements 8, and setting thicknesses for the divided small elements. The two-dimensional small elements were formed by automatic element formation, but for definition of the neutral faces, the operator had to enter data manually. So, it took 3 hours for the modeling work.

Example 2

Figure 11:
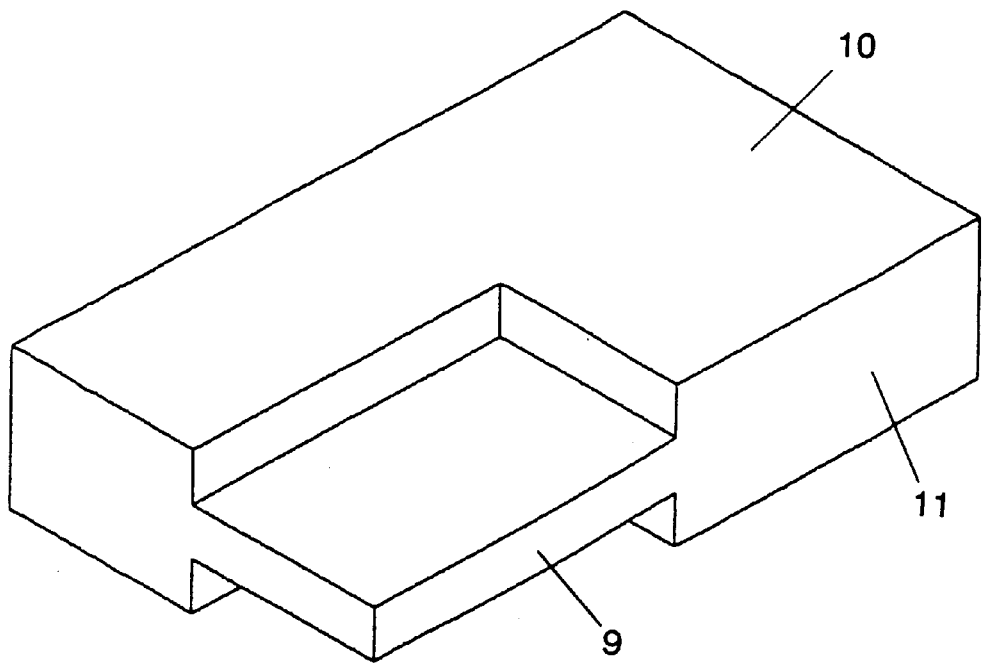
FIG. 11 is a perspective view showing an injection molded product to be analyzed in an example of the present invention.

A plastic molded product 11 with both a thin portion 9 and a thick portion 10 as shown in FIG. 11 was analyzed, and based on the results, the injection molded product was produced. The model was constructed by dividing the entire shape of the molded product including the thin portion 9 into three-dimensional small elements 12 and 13. The injection molding conditions were nylon polymer as the material, 280° C. in injection temperature, 80° C. in mold temperature and 1 second in fill time.

At Step 2 of FIG. 2, the shape was divided into elements automatically by an engineering work station. The time taken for it was about 1 minute. The time taken for the following series of analysis was about 10 minutes.

Figure 13:
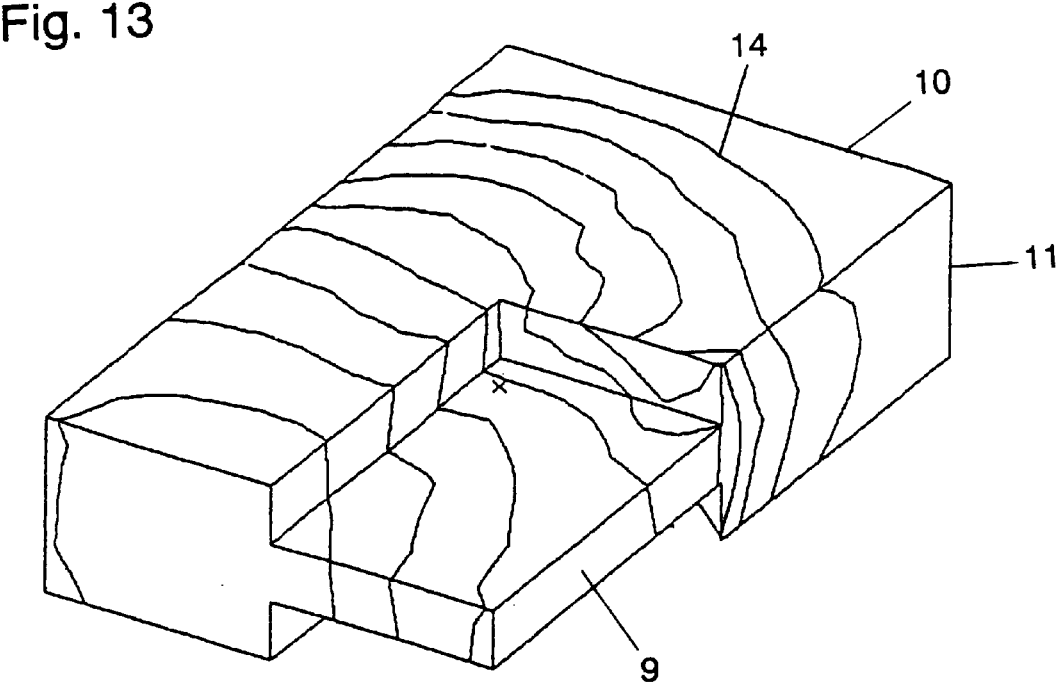
FIG. 13 is a perspective view showing a calculation result on the distribution of pressures of the material of an injection molded product in an example of the present invention.
Figure 14:
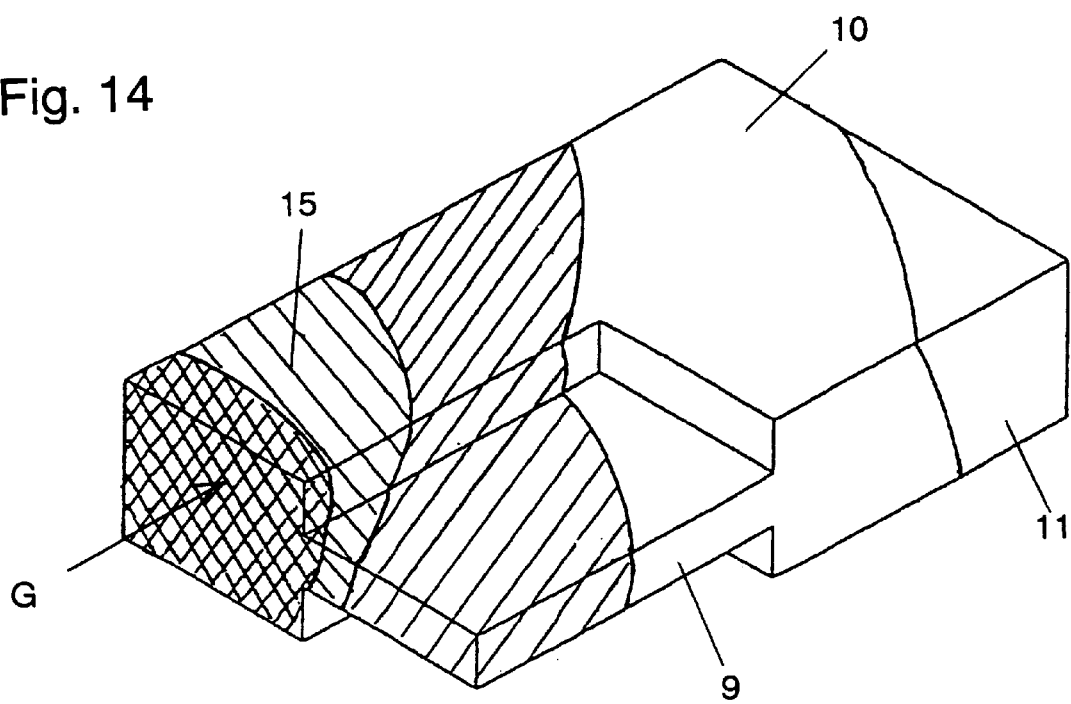
FIG. 14 is a perspective view showing a calculation result on the distribution of pressure transitions of the material of an injection molded product in an example of the present invention.
Figure 15:
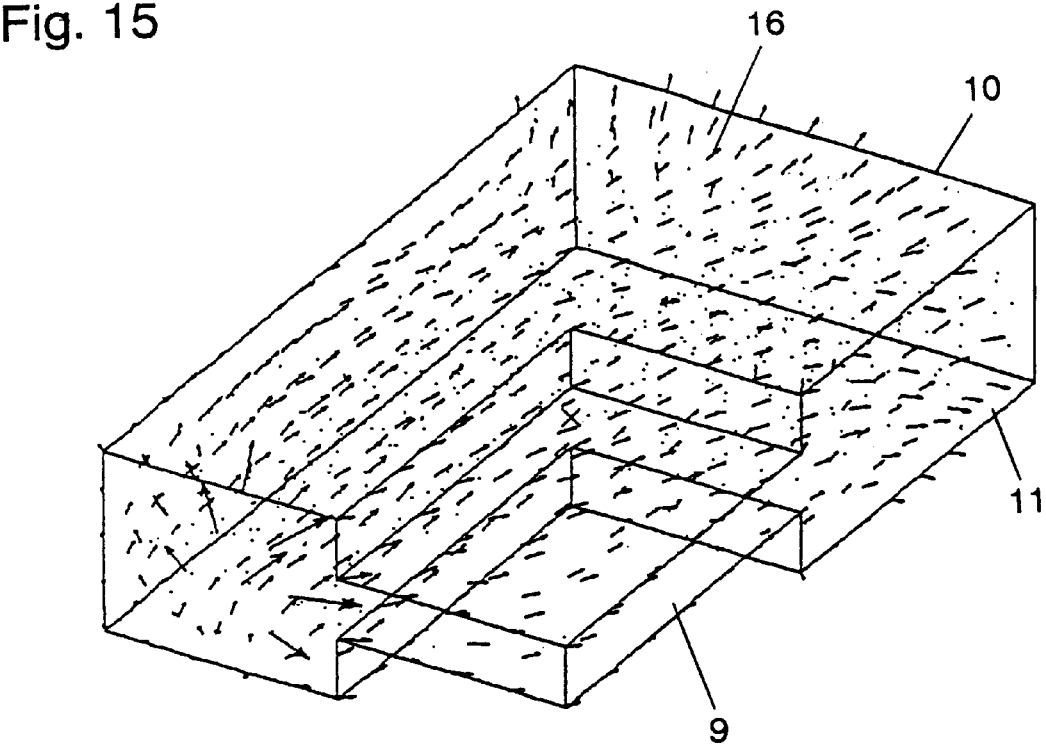
FIG. 15 is a perspective view showing a calculation result on the distribution of flow velocities of the material of an injection molded product in an example of the present invention.

The flow conductances κ of the thick portion 10 were obtained by using the equation (7), and for the thin portion 9 in which small elements had a one-layer structure, they were obtained by using the equation (4). The obtained pressure distribution 14 (maximum pressure 10 MPa) is shown in FIG. 13, and the pressure transition distribution 15 (maximum pressure transition 20 MPa/sec) is shown in FIG. 14. The flow velocity distribution 16 (20 to 50 mm/sec) is shown in FIG. 15. The shear stresses were 5,000 Pa or less. All of these values suggested appropriate flow of the material for the shape of the molded product 11. Symbol G of FIG. 14 stands for a gate.

Since it was judged that injection molding could be effected without any problem, the molded product was produced and found to be good.

Comparative Example 2

Figure 16:
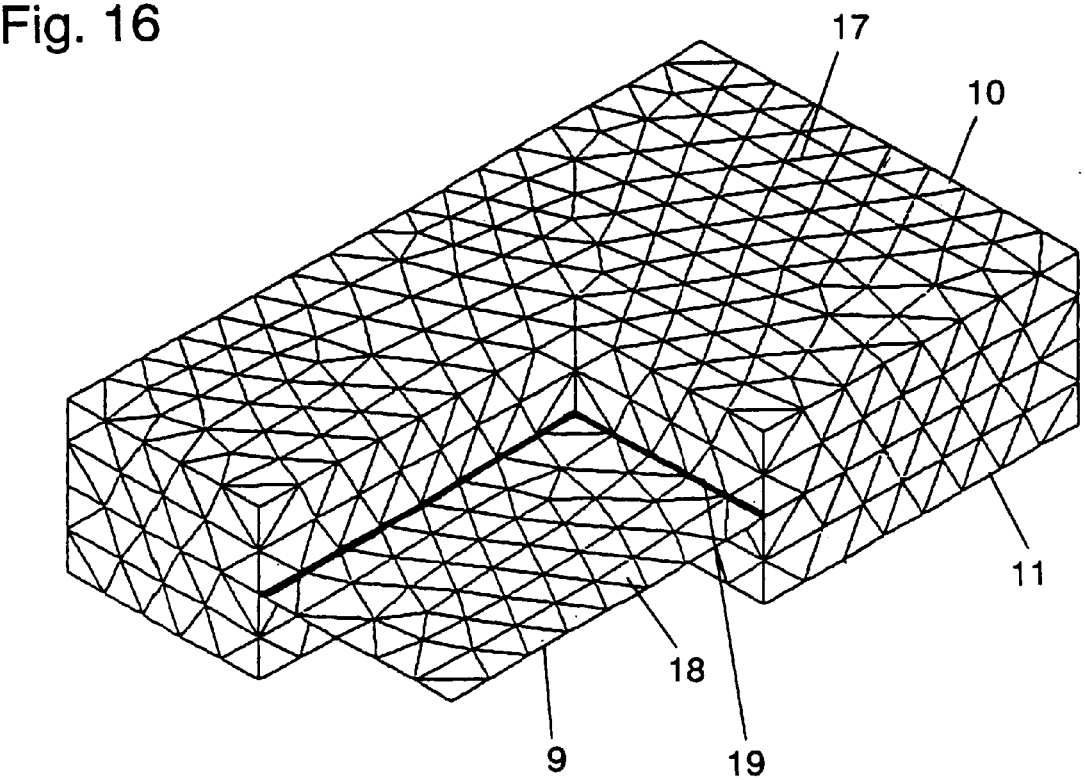
FIG. 16 is a perspective view showing how a model is constructed by dividing the thin portion of the injection molded product shown in FIG. 11 into two-dimensional small elements and dividing the thick portion into three-dimensional small elements.
Figure 17:
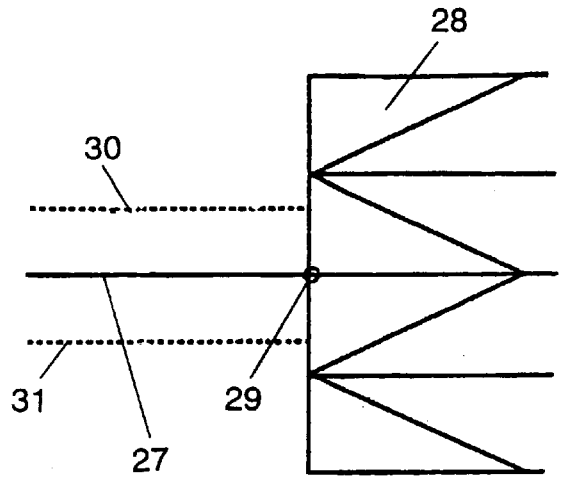
FIG. 17 is a typical view showing how a model is constructed by dividing the narrow portion of a cavity into two-dimensional small elements and dividing the wide portion into three-dimensional elements.
Figure 18:
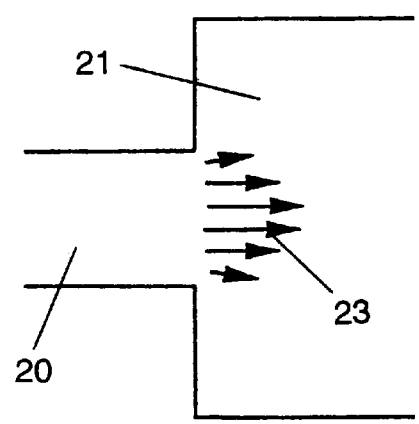
FIG. 18 is a typical view showing how a fluid flows when a model is constructed by dividing both the narrow and wide portions of a cavity into three-dimensional small elements.
Figure 19:
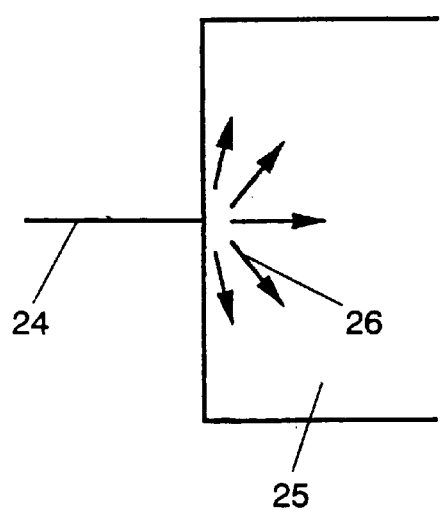
FIG. 19 is a typical view showing how a fluid flows when a model is constructed by dividing the narrow portion of a cavity into two-dimensional small elements and dividing the wide portion into three-dimensional small elements.

The same injection molded product 11 as analyzed in Example 2 was analyzed as described in Example 2, except that the model was constructed by dividing the thick portion 10 into three-dimensional small elements 17 and the thin portion 9 into two-dimensional small elements 18 as shown in FIG. 16.

Since a neutral face in the thickness direction was defined for modeling the thin portion as in the case of Comparative Example 1, the time taken for modeling was long.

Furthermore, since the flow modeled at the joint 19 between the two-dimensional model portion and the three-dimensional model portion was different from the actual flow of material, the obtained pressure distribution, etc. were different from those of Example 2. That is, a result that abnormally high pressures occurred at the joint 19 was obtained. The result suggests that the injection molding conditions threaten to cause a problem.

As described above, according to the apparatus and method for analyzing a process of fluid flow of the present invention, flow conductances κ are obtained based on the flow thicknesses in the narrow portions of a cavity, and the pressure distribution, etc. are obtained based on them. So, in flow analysis, the configuration of the cavity can be accurately represented by using a three-dimensional model, and precise analysis can be effected within a practical computing time.

Furthermore, according to the apparatus and method for analyzing a process of fluid flow of the present invention, flow conductances κ are obtained based on the flow thicknesses in the narrow portions of a cavity, and on the other hand, flow conductances κ are determined using equations established as fast and precise solution methods such as equations (5) and (7) for the wide portions. So, flow conductances κ can be easily obtained, and accurate results of analysis can be obtained within a practical computing time.

According to the apparatus and method for analyzing an injection molding process of the present invention, flow conductances κ are obtained based on the thickness of thin portions, and the pressure distribution, etc. are obtained from them. So, in the analysis of the injection molding process of an injection molded product, the shape of the molded product can be accurately represented by using a three-dimensional model, and precise analysis can be effected within a practical computing time.

Moreover, according to the apparatus and method for analyzing an injection molding process of the present invention, flow conductances κ are obtained based on the thicknesses of thin portions, and on the other hand, flow conductances κ are decided using equations established as fast and precise solution methods such as equations (5) and (7) for the thick portions. So, flow conductances κ can be easily obtained, and accurate results of analysis can be obtained within a practical computing time.

Furthermore, according to the method for producing an injection molded product of the present invention, since injection molding conditions such as product shape, mold design, material selection, etc. are decided using the above mentioned apparatus for analyzing an injection molding process, a high quality injection molded product can be efficiently produced.

What is claimed is:

1. An apparatus for analyzing a process of fluid flow comprising; three-dimensional model constructing means for constructing a three-dimensional model divided into a plurality of small elements representing at least part of a cavity in which fluid flows having a narrow portion, a wide portion and a wall surface, flow conductance determining means for determining the flow conductance κ of the fluid in the small elements in the narrow portion, based on the thickness of the narrow portion, for determining the flow conductance κ of the fluid as a small value when the small elements in the wide portion are located close to the cavity wall surface, for determining the flow conductance κ of the fluid as a large value when the small elements in the wide portion are located far from the cavity wall surface, and pressure computing means for finding pressures of the fluid at said respective small elements based on said flow conductances κ.

2. An apparatus for analyzing a process of fluid flow comprising; three-dimensional model constructing means for constructing a three-dimensional model divided into a plurality of small elements representing at least part of a cavity in which fluid flows having a narrow portion, a wide portion and a wall surface, flow conductance determining means for determining the flow conductance κ of the fluid in the small elements in the narrow portion, based on the thickness of the narrow portion, for determining the flow conductance κ of the fluid as a small value when the small elements in the wide portion are located close to the cavity wall surface, for determining the flow conductance κ of the fluid as a large value when the small elements in the wide portion are located far from the cavity wall surface, and pressure transition computing means for finding pressure transitions of the fluid at said respective small elements based on said flow conductances κ.

3. An apparatus for analyzing a process of fluid flow comprising; three-dimensional model constructing means for constructing a three-dimensional model divided into a plurality of small elements representing at least part of a cavity in which fluid flows having a narrow portion, a wide portion and a wall surface, flow conductance determining means for determining the flow conductance κ of the fluid in the small elements in the narrow portion, based on the thickness of the narrow portion, for determining the flow conductance κ of the fluid as a small value when the small elements in the wide portion are located close to the cavity wall surface, for determining the flow conductance κ of the fluid as a large value when the small elements in the wide portion are located far from the cavity wall surface, and flow velocity computing means for finding flow velocities of the fluid at said respective small elements based on said flow conductances κ.

4. A method for analyzing a process of fluid flow comprising; constructing a three-dimensional model divided into a plurality of small elements representing at least part of a cavity in which fluid flows, determining the flow conductances κ of the fluid at the small elements, based on the flow thicknesses of the small elements, finding pressures of the fluid at the respective small elements based on the determined flow conductances κ, and analyzing the process of the fluid flow in reference to the found pressures.

5. A method for analyzing a process of fluid flow comprising; constructing a three-dimensional model divided into a plurality of small elements representing at least part of a cavity in which fluid flows, determining the flow conductances κ of the fluid at the small elements, based on the flow thicknesses of the small elements, finding pressure transitions of the fluid at the respective small elements based on the determined flow conductances κ, and analyzing the process of the fluid flow in reference to the found pressure transitions.

6. A method for analyzing a process of fluid flow comprising; constructing a three-dimensional model divided into a plurality of small elements representing at least part of a cavity in which fluid flows, determining the flow conductances κ of the fluid at the small elements, based on the flow thicknesses of the small elements, finding flow velocities of the fluid at the respective small elements based on the determined flow conductances κ, and analyzing the process of the fluid flow in reference to the found flow velocities.

7. An apparatus for analyzing an injection molding process comprising; three-dimensional model constructing means for constructing a three-dimensional model divided into a plurality of small elements representing at least part of an injection molded product having a narrow portion and a wide portion, flow conductance determining means for determining the flow conductance κ of the injection molded material in the small elements in the narrow portion, based on the thickness of the narrow portion, for determining the flow conductance κ of the injection molded material as a small value when the small elements in the wide portion are located close to the mold surface, for determining the flow conductance κ of the injection molded material as a large value when the small elements in the wide portion are located far from the mold surface, and pressure computing means for finding pressures of the injection molded material at said respective small elements based on said flow conductances κ.

8. An apparatus for analyzing an injection molding process comprising; three-dimensional model constructing means for constructing a three-dimensional model divided into a plurality of small elements representing at least part of an injection molded product having a narrow portion and a wide portion, flow conductance determining means for determining the flow conductance κ of the injection molded material in the small elements in the narrow portion, based on the thickness of the narrow portion, for determining the flow conductance κ of the injection molded material as a small value when the small elements in the wide portion are located close to the mold surface, for determining the flow conductance κ of the injection molded material as a large value when the small elements in the wide potion are located far from the mold surface, and pressure transition computing means for finding pressure transitions of the injection molded material at said respective small elements based on said flow conductances κ.

9. An apparatus for analyzing an injection molding process comprising; three-dimensional model constructing means for constructing a three-dimensional model divided into a plurality of small elements representing at least part of an injection molded product having a narrow portion and a wide portion, flow conductance determining means for determining the flow conductance κ of the injection molded material in the small elements in the narrow portion, based on the thickness of the narrow portion, for determining the flow conductance κ of the injection molded material as a small value when the small elements in the wide portion are located close to the mold surface, for determining the flow conductance κ of the injection molded material as a large value when the small elements in the wide portion are located far from the mold surface, and flow velocity transition computing means for finding flow velocities of the injection molded material at said respective small elements based on said flow conductances κ.

10. An apparatus for analyzing an injection molding process, according to any one of claims 7 through 9, wherein said three-dimensional model constructing means constructs a three-dimensional model based on the CAD data or CAD surface data of an injection molded product.

11. A method for analyzing an injection molding process comprising; constructing a three-dimensional model divided into a plurality of small elements representing at least part of an injection molded product, determining the flow conductances κ of the injection molded material at the small elements, based on the flow thicknesses of said small elements, finding pressures of the injection molded material at the respective small elements based on the determined flow conductances κ, and analyzing the injection molding process of the injection molded product in reference to the found pressures.

12. A method for analyzing an injection molding process comprising; constructing a three-dimensional model divided into a plurality of small elements representing at least part of an injection molded product, determining the flow conductances κ of the injection molded material at the small elements, based on the flow thicknesses of the injection molded product at said small elements, obtaining pressure transitions of the injection molded material at the respective small elements based on the determined flow conductances κ, and analyzing the injection molding process of the injection molded product in reference to the found pressure transitions.

13. A method for analyzing an injection molding process comprising; constructing a three-dimensional model divided into a plurality of small elements representing at least part of an injection molded product, determining the flow conductances κ of the injection molded material at the small elements, based on the flow thicknesses of the injection molded product at said small elements, obtaining flow velocities of the injection molded material at the respective small elements based on the determined flow conductances κ, and analyzing the injection molding process of the injection molded product in reference to the found flow velocities.

14. A method for analyzing an injection molding process comprising; constructing a three-dimensional model divided into a plurality of small elements representing at least part of an injection molded product having a thin portion and a thick portion, determining the flow conductance κ of the injection molded material in the small elements in the thin portion, based on the thickness of the thin portion, for determining the flow conductance κ of the injection molded material in the small elements in the thick portion, based on the function F(R, η) which increases with the increase of the minimum distance R between the small element and the mold surface and decreases with the increase of the viscosity η of the injection molded material, finding pressures of the injection molded material at the respective small elements based on the determined flow conductances κ, and analyzing the injection molding process of the injection molded product in reference to the found pressures.

15. A method for analyzing an injection molding process comprising; constructing a three-dimensional model divided into a plurality of small elements representing at least part of an injection molded product having a thin portion and a thick portion, determining the flow conductance κ of the injection molded material in the small elements in the thin portion, based on the thickness of the thin portion, for determining the flow conductance κ of the injection molded material in the small elements in the thick portion, by solving the following formula:

$$\frac{\partial^2 \kappa}{\partial x^2} + \frac{\partial^2 \kappa}{\partial y^2} + \frac{\partial^2 \kappa}{\partial z^2} = -\frac{1}{\eta}$$

(where η is viscosity of the injection molded material, and x, y and z express the position of said small element), finding pressures of the injection molded material at the respective small elements based on the determined flow conductances κ, and analyzing the injection molding process of the injection molded product in reference to the found pressures.

16. A method for producing an injection molded product comprising; determining the injection molding conditions of an injection molded product having a thin portion and a thick portion, constructing a three-dimensional model divided into a plurality of small elements representing at least part of the injection molded product, determining the flow conductance κ of the injection molded material in the small elements in the thin portion, based on the thickness of the thin portion, for determining the flow conductance κ of the injection molded material as a small value when any of the small elements in the wide portion are located close to the mold surface, for determining the flow conductance κ of the injection molded material as a large value when the small elements in the thick portion are located far from the mold surface, finding pressures of the injection molded material at the respective small elements based on the determined flow conductances κ, finally determining the injection molding conditions based on the distribution of the found pressures, and producing the injection molded product based on the finally determined injection molding conditions.

17. A method for producing an injection molded product comprising; determining the injection molding conditions of an injection molded product having a thin portion and a thick portion, constructing a three-dimensional model divided into a plurality of small elements representing at least part of an injection molded product, determining the flow conductance κ of the injection molded material in the small elements in the thin portion, based on the thickness of the thin portion, for determining the flow conductance κ of the injection molded material as a small value when the small elements in the thick portion are located close to the mold surface, for determining the flow conductance κ of the injection molded material as a large value when the small elements in the thick portion are located far from the mold surface, finding pressure transitions of the injection molded material at the respective small elements based on the determined flow conductances κ, finally determining the injection molding conditions based on the distribution of the found pressure transitions, and producing the injection molded product based on the finally determined injection molding conditions.

18. A method for producing an injection molded product comprising; determining the injection molding conditions of an injection molded product having a thin portion and a thick portion, constructing a three-dimensional model divided into a plurality of small elements representing at least part of an injection molded product, determining the flow conductance κ of the injection molded material in the small elements in the thin portion, based on the thickness of the thin portion, for determining the flow conductance κ of the injection molded material as a small value when the small elements in the wide portion are located close to the mold surface, for determining the flow conductance κ of the injection molded material as a large value when the small elements in the thick portion are located far from the mold surface, finding flow velocities of the injection molded material at the respective small elements based on the determined flow conductances κ, finally determining the injection molding conditions based on the distribution of the found flow velocities, and producing the injection molded product based on the finally determined injection molding conditions.

19. A method for producing an injection molded product, according to any one of claims 16 through 18, wherein said injection molding conditions contain at least one of the shape of the injection molded product, mold configuration, injection speed, injection temperature, mold temperature and injection molded material.

* * * * *